(12) United States Patent
Murakami et al.

(10) Patent No.: US 11,447,121 B2
(45) Date of Patent: Sep. 20, 2022

(54) CONTROL APPARATUS AND CONTROL METHOD FOR HYBRID SYSTEM OF VEHICLE

(71) Applicant: TOYOTA JIDOSHA KABUSHIKI KAISHA, Toyota (JP)

(72) Inventors: Koji Murakami, Toyota (JP); Hiroshi Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 16/205,312

(22) Filed: Nov. 30, 2018

(65) Prior Publication Data
US 2019/0210588 A1 Jul. 11, 2019

(30) Foreign Application Priority Data

Jan. 10, 2018 (JP) .............................. JP2018-002045

(51) Int. Cl.
*B60W 20/13* (2016.01)
*H02J 7/14* (2006.01)
*H02J 7/00* (2006.01)

(52) U.S. Cl.
CPC .......... *B60W 20/13* (2016.01); *H02J 7/0068* (2013.01); *H02J 7/14* (2013.01);
(Continued)

(58) Field of Classification Search
CPC ............. B60W 20/13; B60W 2710/08; B60W 2710/0666; B60W 2710/242;
(Continued)

(56) References Cited

U.S. PATENT DOCUMENTS

| 6,314,346 B1 * | 11/2001 | Kitajima | B60K 6/28 |
| | | | 701/22 |
| 2004/0169497 A1 * | 9/2004 | Colley | H02M 7/06 |
| | | | 323/212 |

(Continued)

FOREIGN PATENT DOCUMENTS

| JP | 2005212595 A | * | 8/2005 |
| JP | 2011-183910 | | 9/2011 |
| JP | 2011183910 A | * | 9/2011 |

OTHER PUBLICATIONS

Yamanaka et al, "Power Output Device, Car with the Power Output Device Mounted Thereon, and Control Method Therefor", Japanese Patent Publication JP 2005-212595A, Aug. 11, 2005, English Translation from IP.com (Year: 2005).*

(Continued)

*Primary Examiner* — Nadeem Odeh
(74) *Attorney, Agent, or Firm* — Oblon, McClelland, Maier & Neustadt, L.L.P.

(57) ABSTRACT

When the state of charge of a battery is greater than or equal to a lower limit value and less than or equal to an upper limit value, an electronic control unit calculates a charging electric energy transferred between a motor-generator and the battery such that the battery is neither charged nor discharged. When the state of charge is less than the lower limit value, a required torque of the engine is calculated based on the charging electric energy, a power consumption of an auxiliary device, and a driving torque. When the state of charge is greater than or equal to the lower limit value and less than or equal to the upper limit value, the required torque is calculated based on the charging electric energy and the driving torque, without taking the power consumption into consideration.

5 Claims, 3 Drawing Sheets

(52) U.S. Cl.
CPC ............... *B60W 2510/244* (2013.01); *B60W 2710/0666* (2013.01); *B60W 2710/08* (2013.01); *B60W 2710/242* (2013.01)

(58) Field of Classification Search
CPC ....... B60W 2510/244; B60W 2710/06; B60W 2710/0677; B60W 2510/30; B60W 2510/305; H02J 7/14; H02J 7/0068
See application file for complete search history.

(56) References Cited

U.S. PATENT DOCUMENTS

| | | | |
|---|---|---|---|
| 2009/0131215 A1* | 5/2009 | Shamoto | B60W 20/00 |
| | | | 477/3 |
| 2016/0152152 A1* | 6/2016 | Gaither | B60L 50/15 |
| | | | 701/22 |
| 2018/0134273 A1* | 5/2018 | Oh | B60W 10/26 |
| 2018/0281773 A1* | 10/2018 | Bell | B60W 20/13 |
| 2018/0312158 A1* | 11/2018 | Morimoto | B60W 10/30 |

OTHER PUBLICATIONS

Yamamoto et al, "Hybrid Vehicle and Method of Controlling the Same", Japanese Patent Publication JP 2011-183910A, Sep. 22, 2011, English Translation from Espacenet (Year: 2011).*

* cited by examiner

CONTROL APPARATUS AND CONTROL METHOD FOR HYBRID SYSTEM OF VEHICLE

BACKGROUND

The present disclosure relates to a control apparatus and a control method applied to a hybrid system of a vehicle.

The hybrid system disclosed in Japanese Laid-Open Patent Publication No. 2011-183910 includes, as drive sources, an engine and a motor-generator drivingly coupled to the engine. The hybrid system further includes an electronic control unit, which calculates the required torque of the engine. The electronic control unit calculates a driving torque required to propel the vehicle. Based on the state of charge (SOC) of the battery, which supplies electric power to the motor-generator, the electronic control unit also calculates the charging electric energy of the battery and the power consumption of an auxiliary device that receives electric power supply from the battery. The electronic control unit calculates the required torque of the engine in accordance with the driving torque, the charging electric energy, and the power consumption. Of the required torque, the torque corresponding to the driving torque is transmitted to the driving wheels to propel the vehicle, and the remaining torque is transmitted to the motor-generator, so that the motor-generator generates electric power.

SUMMARY

Examples of the present disclosure will now be described.

Example 1

A control apparatus for a hybrid system of a vehicle is provided. The vehicle includes an engine, a motor-generator drivingly coupled to the engine, a battery, which supplies electric power to the motor-generator, and an auxiliary device, which receives electric power supply from the battery. The control apparatus includes an electric power calculating section and an engine control section. The electric power calculating section is configured to calculate a charging electric energy transferred between the motor-generator and the battery based on a state of charge of the battery and to calculate a power consumption of the auxiliary device. The engine control section configured to calculate a required torque of the engine based on the charging electric energy, the power consumption, and a driving torque, which is required to propel the vehicle. The electric power calculating section is configured to: calculate the charging electric energy such that electric power is supplied from the motor-generator to charge the battery when the state of charge of the battery is less than a predetermined lower limit value; calculate the charging electric energy such that the battery is neither charged nor discharged when the state of charge is greater than or equal to the lower limit value and less than or equal to an upper limit value, the upper limit value being previously set to a value greater than the lower limit value; and calculate the charging electric energy such that electric power is supplied from the battery to the motor-generator when the state of charge is greater than the upper limit value. The engine control section is configured to: calculate the required torque based on the charging electric energy, the power consumption, and the driving torque when the state of charge is less than the lower limit value; and calculate the required torque based on the charging electric energy and the driving torque without taking the power consumption into consideration when the state of charge is greater than or equal to the lower limit value and less than or equal to the upper limit value.

With the above configuration, when the state of charge of the battery is greater than or equal to the lower limit value and less than or equal to the upper limit value, that is, when the charging electric energy is calculated as a value at which the battery is neither charged nor discharged, the power consumption of the auxiliary device is not reflected in calculating the required torque. Thus, when the charging electric energy takes a value at which the battery is neither charged nor discharged, the motor-generator does not generate electric power in a very small amount solely to generate electric power corresponding to the power consumption of the auxiliary device. This limits deterioration of the fuel efficiency that is otherwise caused when the motor-generator generates electric power in a very small amount.

In the hybrid system disclosed in the above-described Japanese Laid-Open Patent Publication No. 2011-183910, the battery is typically controlled to be charged using the engine torque when the state of charge of the battery falls below a predetermined lower limit value. When the state of charge of the battery exceeds a predetermined upper limit value, the battery is controlled to be discharged. When the state of charge of the battery is between the lower limit value and the upper limit value, the battery is controlled to be neither charged nor discharged. Thus, in the hybrid system of the above-described publication, when the state of charge of the battery is between the lower limit value and the upper limit value, the engine control apparatus calculates the charging electric energy as zero.

When the charging electric energy is calculated as zero, in the hybrid system of the above-described publication, only the torque corresponding to the power consumption of the auxiliary device is transmitted from the engine to the motor-generator, and the motor-generator generates electric power. However, depending on, for example, the operating condition of the vehicle, the power consumption of the auxiliary device that receives electric power supply from the battery may be small. In this case, the motor-generator generates electric power in a very small amount. When the motor-generator is to generate a very small amount of electric power, the power generation efficiency deteriorates. Thus, in the hybrid system of Japanese Laid-Open Patent Publication No. 2011-183910, the fuel efficiency may possibly deteriorate when the motor-generator generates electric power in a very small amount. However, the configuration of Example 1 limits such deterioration of the fuel efficiency.

Example 2

In the control apparatus of Example 1, discharging electric energy is the charging electric energy supplied from the battery to the motor-generator. The engine control section is configured to calculate the required torque without taking into consideration at least the power consumption of the auxiliary device and the charging electric energy when the state of charge is greater than the upper limit value and the power consumption is greater than the discharging electric energy.

With the configuration of Example 1, even if the state of charge of the battery is greater than the upper limit value, that is, even if the charging electric energy takes a value at which the battery is discharged (discharging electric energy), the motor-generator may be considered to generate electric power to compensate for the shortage in a case in which the power consumption of the auxiliary device is greater than the discharging electric energy. However, with the configuration of Example 2, under such circumstances, the required torque is calculated without taking at least the power consumption into consideration. Thus, the motor-generator does not generate electric power in a very small amount to compensate for the shortage for the power consumption of the auxiliary device. As a result, deterioration of fuel efficiency is limited that is otherwise caused when the motor-generator generates electric power in a very small amount.

Example 3

In the control apparatus of Example 2, the engine control section is configured to calculate the required torque based on the charging electric energy, the power consumption, and the driving torque when the state of charge is greater than the upper limit value and the power consumption is less than or equal to the discharging electric energy.

With the above configuration, when the charging electric energy (discharging electric energy) of the battery can cover the power consumption of the auxiliary device, the required torque of the engine is calculated based on the charging electric energy, the power consumption, and the driving torque. In this manner, since the required torque is calculated taking the power consumption of the auxiliary device into consideration, even if the output power from the battery is increased, the state of charge of the battery is prevented from being excessively decreased.

Example 4

In the control apparatus of any one of Examples 1 to 3, the engine control section is configured to: use a first lower limit value as the lower limit value when the motor-generator is being discharged; and use a second lower limit value greater than the first lower limit value as the lower limit value when the motor-generator is generating electric power.

With the above configuration, when the motor-generator is generating electric power, even if the state of charge exceeds the first lower limit value, generation of electric power is continued until the state of charge exceeds the second lower limit value. Thus, the period of time during which electric power is generated is extended, and the charging amount of the battery is increased accordingly.

Example 5

In the control apparatus of Example 4, the second lower limit value is set such that a difference between the first lower limit value and the second lower limit value is greater when the power consumption is great than when the power consumption is small.

With the above configuration, when the power consumption of the auxiliary device is great and the power of the battery is easily consumed, the period during which the motor-generator generates electric power is extended. Thus, the state of charge of the battery is prevented from being excessively decreased.

Example 6

A control method for a hybrid system of a vehicle is provided that performs the various processes described in Examples 1 to 5.

Example 7

A non-transitory computer readable memory medium is provided that stores a program that causes a processing device to perform the various processes described in Examples 1 to 5.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION

Hereinafter, a hybrid system of a vehicle according to a first embodiment of the present disclosure will be described. First, the schematic configuration of the hybrid system will be described with reference to FIG. 1.

Figure 1:
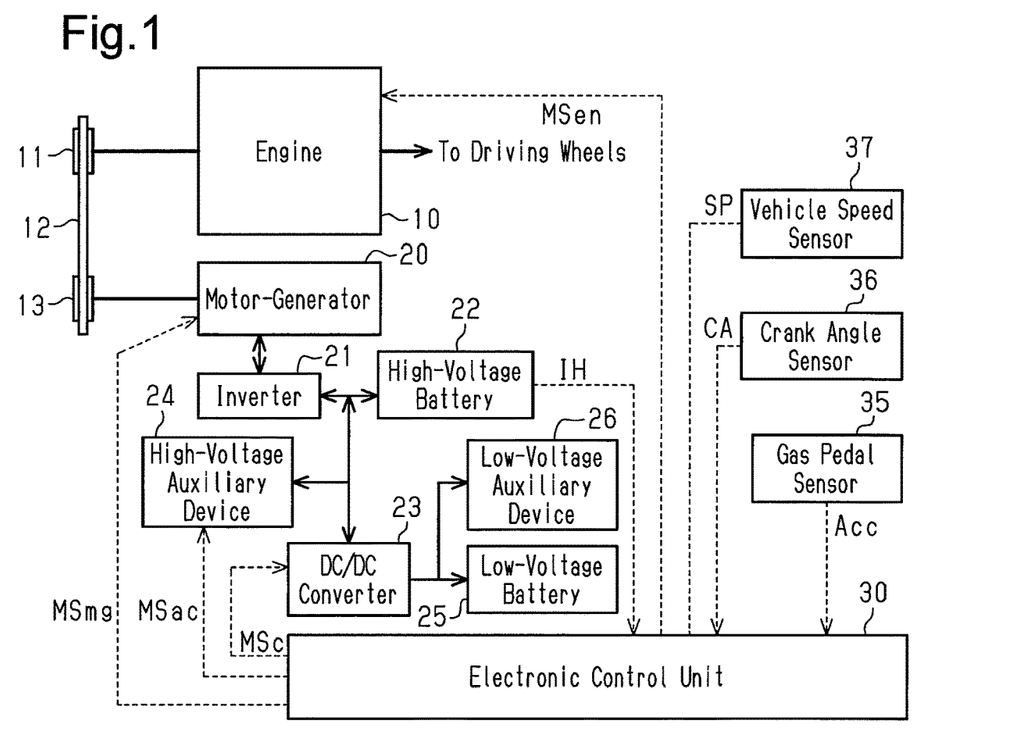
FIG. 1 is a schematic diagram illustrating a hybrid system of a vehicle.

As shown in FIG. 1, the hybrid system includes, as drive sources, an engine 10 and a motor-generator 20. The crankshaft of the engine 10 is drivingly coupled to driving wheels via, for example, a non-illustrated transmission. Furthermore, the crankshaft of the engine 10 is drivingly coupled to a first pulley 11. A transmission belt 12 is looped over the first pulley 11. Although not shown, the crankshaft of the engine 10 is also drivingly coupled to a component such as a pump for generating hydraulic pressure via, for example, a belt, a pulley, and a chain.

The motor-generator 20 is a three-phase AC motor. The output shaft of the motor-generator 20 is drivingly coupled to a second pulley 13. The transmission belt 12 is looped over the second pulley 13. That is, the motor-generator 20 is drivingly coupled to the engine 10 via the second pulley 13, the transmission belt 12, and the first pulley 11. When the motor-generator 20 functions as the electric motor, the motor-generator 20 gives rotational torque to the second pulley 13, and the rotational torque is input to the crankshaft of the engine 10 via the transmission belt 12 and the first pulley 11. That is, the motor-generator 20 assists in driving of the engine 10. When the motor-generator 20 functions as a generator, the rotational torque of the crankshaft of the engine 10 is input to the output shaft of the motor-generator 20 via the first pulley 11, the transmission belt 12, and the second pulley 13. Thus, the motor-generator 20 generates electric power in accordance with the rotation of the output shaft.

A high-voltage battery 22 is connected to the motor-generator 20 via an inverter 21. The inverter 21 is a bidirectional inverter. The AC voltage generated by the motor-generator 20 is converted to DC voltage and output to the high-voltage battery 22. The DC voltage output by the high-voltage battery 22 is converted to AC voltage and output to the motor-generator 20. In FIG. 1, the inverter 21 is illustrated separately from the motor-generator 20. However, the inverter 21 may be incorporated in the housing of the motor-generator 20.

The high-voltage battery 22 is a 48-V lithium-ion battery. When the motor-generator 20 functions as the electric motor, the high-voltage battery 22 supplies electric power to the motor-generator 20. When the motor-generator 20 functions as the generator, the high-voltage battery 22 receives electric power from the motor-generator 20 and is charged.

A high-voltage auxiliary device 24 is connected to the motor-generator 20 via the inverter 21. Furthermore, the high-voltage auxiliary device 24 is also connected to the high-voltage battery 22. That is, the high-voltage auxiliary device 24 is a kind of auxiliary device that receives electric power supply from the inverter 21 (the motor-generator 20) and the high-voltage battery 22. The high-voltage auxiliary device 24 is an electric device driven by a DC voltage of 48 volts from the inverter 21 and the high-voltage battery 22 and is, for example, an electric turbocharger or an electric compressor.

A DC/DC converter 23 is connected to the motor-generator 20 via the inverter 21. The DC/DC converter 23 is also connected to the high-voltage battery 22. That is, the DC/DC converter 23 receives electric power supply from the inverter 21 (the motor-generator 20) and the high-voltage battery 22. The DC/DC converter 23 steps down the 48V DC voltage output from the inverter 21 and the high-voltage battery 22 to 12V to 15V and outputs. In the present embodiment, the DC/DC converter 23 is a kind of auxiliary device that receives electric power supply from the inverter 21 (the motor-generator 20) and the high-voltage battery 22. A low-voltage battery 25 is connected to the DC/DC converter 23.

The low-voltage battery 25 is a 12-V lead-acid battery, having a voltage lower than that of the high-voltage battery 22. When the DC/DC converter 23 is not driven or when the output voltage of the DC/DC converter 23 is less than or equal to the open circuit voltage (OCV) of the low-voltage battery 25, the low-voltage battery 25 outputs a 12V DC voltage. When the output voltage of the DC/DC converter 23 is greater than the open circuit voltage of the low-voltage battery 25, the low-voltage battery 25 receives electric power supply from the DC/DC converter 23 and is charged.

Various low-voltage auxiliary devices 26 are connected to the DC/DC converter 23 and the low-voltage battery 25. Examples of the low-voltage auxiliary devices 26 include lights such as vehicle headlights, turn signals, and room lights, and interior car accessories such as car navigation systems and speakers. When the DC/DC converter 23 is not driven, the low-voltage auxiliary devices 26 receive electric power supply from the low-voltage battery 25. When the output voltage of the DC/DC converter 23 is greater than the open circuit voltage of the low-voltage battery 25, the low-voltage auxiliary devices 26 receive electric power supply from the DC/DC converter 23.

The hybrid system includes an electronic control unit 30, which controls the engine 10, the motor-generator 20, the DC/DC converter 23, and the high-voltage auxiliary device 24. The electronic control unit 30 is a processing circuit (computer) including, for example, a computing section, which executes various programs (applications), a nonvolatile memory, which stores data such as programs, and a volatile memory, which temporarily stores data when the programs are executed.

The electronic control unit 30 receives signals indicating state information IH of the high-voltage battery 22 from the high-voltage battery 22. The state information IH of the high-voltage battery 22 includes, for example, an output voltage value, an output current value, and a temperature of the high-voltage battery 22. The electronic control unit 30 calculates the state of charge (SOC) of the high-voltage battery 22 based on the state information IH of the high-voltage battery 22. In the present embodiment, the state of charge of the high-voltage battery 22 is represented by the ratio of the amount of electric energy charged in the high-voltage battery 22 at the point in time when the state information IH is input relative to the amount of electric energy when the high-voltage battery 22 is fully charged and is expressed as, for example, a percentage (%). Although not shown, the electronic control unit 30 receives signals indicating the state information (such as the output voltage value, the output current value, and the temperature) of the low-voltage battery 25 from the low-voltage battery 25. The electronic control unit 30 calculates, for example, the state of charge of the low-voltage battery 25 based on the state information of the low-voltage battery 25.

The electronic control unit 30 additionally receives signals from, for example, various sensors installed in the vehicle. More specifically, the electronic control unit 30 receives a signal indicating a depression amount Acc of a gas pedal from a gas pedal sensor 35. The electronic control unit 30 also receives a signal indicating a rotational angle CA per unit time of the drive shaft (crankshaft) of the engine 10 from a crank angle sensor 36. Furthermore, the electronic control unit 30 receives a signal indicating a vehicle speed SP of the vehicle from a vehicle speed sensor 37.

The electronic control unit 30 generates an operation signal MSen for controlling the engine 10 based on the received various signals and outputs the operation signal MSen to the engine 10. The electronic control unit 30 generates an operation signal MSmg for controlling the motor-generator 20 based on the received various signals and outputs the operation signal MSmg to the motor-generator 20. The electronic control unit 30 also generates an operation signal MSc for controlling the DC/DC converter 23 based on the received various signals and outputs the operation signal MSc to the DC/DC converter 23. Furthermore, the electronic control unit 30 generates an operation signal MSac for controlling the high-voltage auxiliary device 24 based on the received various signals and outputs the operation signal MSac to the high-voltage auxiliary device 24.

Figure 2:
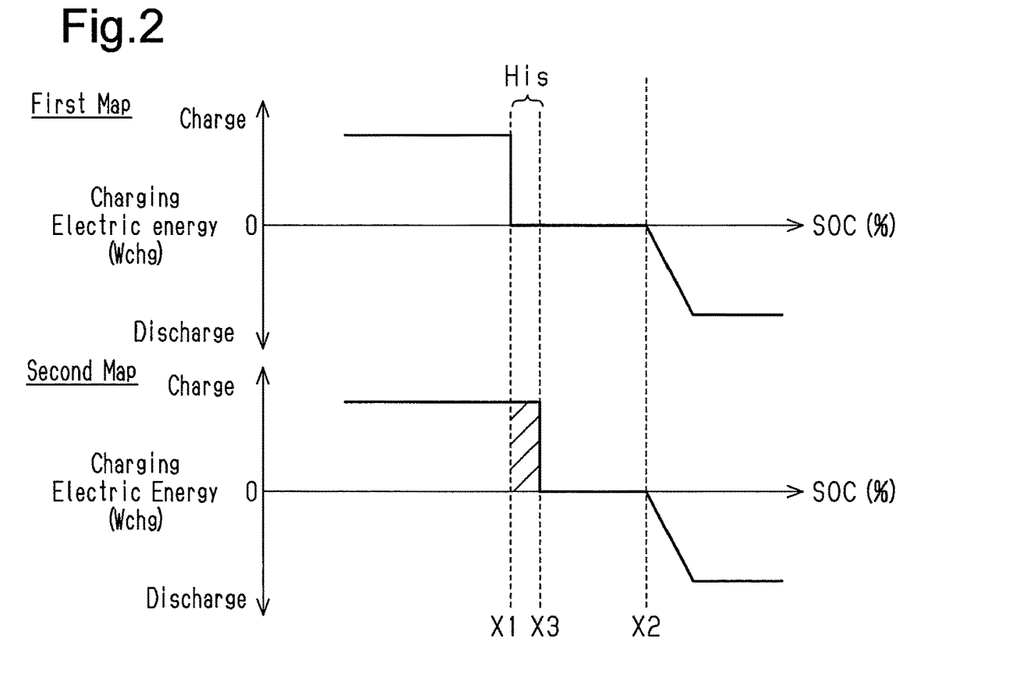
FIG. 2 is a first map and a second map illustrating the relationship between a state of charge (SOC) and a charging electric energy in the hybrid system of FIG. 1.

The memory of the electronic control unit 30 stores a first map and a second map for calculating a charging electric energy Wchg of the high-voltage battery 22. The first map and the second map show the relationship between the charging electric energy Wchg of the high-voltage battery 22 and the state of charge (SOC) of the high-voltage battery 22.

More specifically, as shown in FIG. 2, in the first map, when the state of charge (SOC) of the high-voltage battery 22 is less than a first lower limit value X1, the charging electric energy Wchg is set to a positive constant value so that electric power is supplied from the motor-generator 20 to the high-voltage battery 22 to charge the high-voltage battery 22. Furthermore, in the first map, when the state of charge is greater than or equal to the first lower limit value X1 and less than or equal to an upper limit value X2, the charging electric energy Wchg is set to zero so that the high-voltage battery 22 is neither charged nor discharged. In the first map, when the state of charge is greater than the upper limit value X2, the charging electric energy Wchg is set to a negative value so that the high-voltage battery 22 discharges to supply electric power to the motor-generator 20. In the present embodiment, as the state of charge becomes greater than the upper limit value X2, the charging electric energy Wchg is decreased, that is, the discharging electric energy is increased. After the state of charge of the high-voltage battery 22 becomes greater than a certain state of charge, the charging electric energy Wchg is set to a negative constant value. In the present embodiment, the negative charging electric energy Wchg represents the discharging electric energy of the high-voltage battery 22.

The above-described first lower limit value X1 is set to a value within a range of, for example, 30 to 50% assuming that the state of charge when the high-voltage battery 22 is fully charged is 100%. In the present embodiment, the first lower limit value X1 is 40%. The upper limit value X2 is set to a value within a range of, for example, 60 to 80% assuming that the state of charge when the high-voltage battery 22 is fully charged is 100%. In the present embodiment, the upper limit value X2 is 70%.

Figure 4:
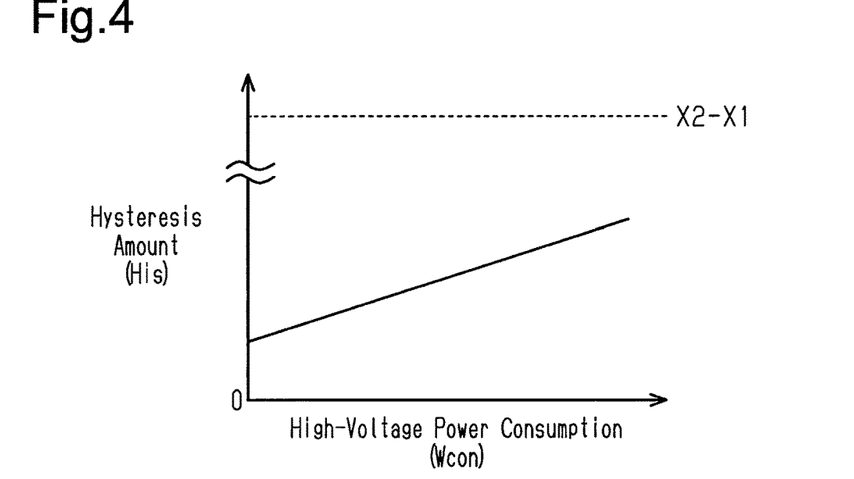
FIG. 4 is a graph showing the relationship between high-voltage power consumption and a hysteresis amount in the hybrid system of FIG. 1.

In the second map of FIG. 2, when the state of charge is less than a second lower limit value X3, the charging electric energy Wchg is set to a positive constant value so that electric power is supplied from the motor-generator 20 to the high-voltage battery 22 to charge the high-voltage battery 22. The second lower limit value X3 is set to a value greater than the first lower limit value X1 by the amount corresponding to a hysteresis amount His. The hysteresis amount His is a variable calculated in accordance with the driving condition of the DC/DC converter 23 and the high-voltage auxiliary device 24. More specifically, as shown in FIG. 4, when a value obtained by adding up the output power of the DC/DC converter 23 and the consumed power of the high-voltage auxiliary device 24 is referred to as a high-voltage power consumption Wcon, the hysteresis amount His is calculated to have a greater value as the high-voltage power consumption Wcon is increased. The hysteresis amount His is set not to exceed the difference between the first lower limit value X1 and the upper limit value X2 and is set not to be greater than or equal to 10%, for example. In other words, the second lower limit value X3 does not exceed the upper limit value X2.

In the second map, when the state of charge is greater than or equal to the second lower limit value X3 and less than or equal to the upper limit value X2, the charging electric energy Wchg is set to zero so that the high-voltage battery 22 is neither charged nor discharged. In the second map, like the first map described above, when the state of charge is greater than the upper limit value X2, the charging electric energy Wchg is set to a negative value so that the high-voltage battery 22 discharges to supply electric power to the motor-generator 20.

Figure 3:
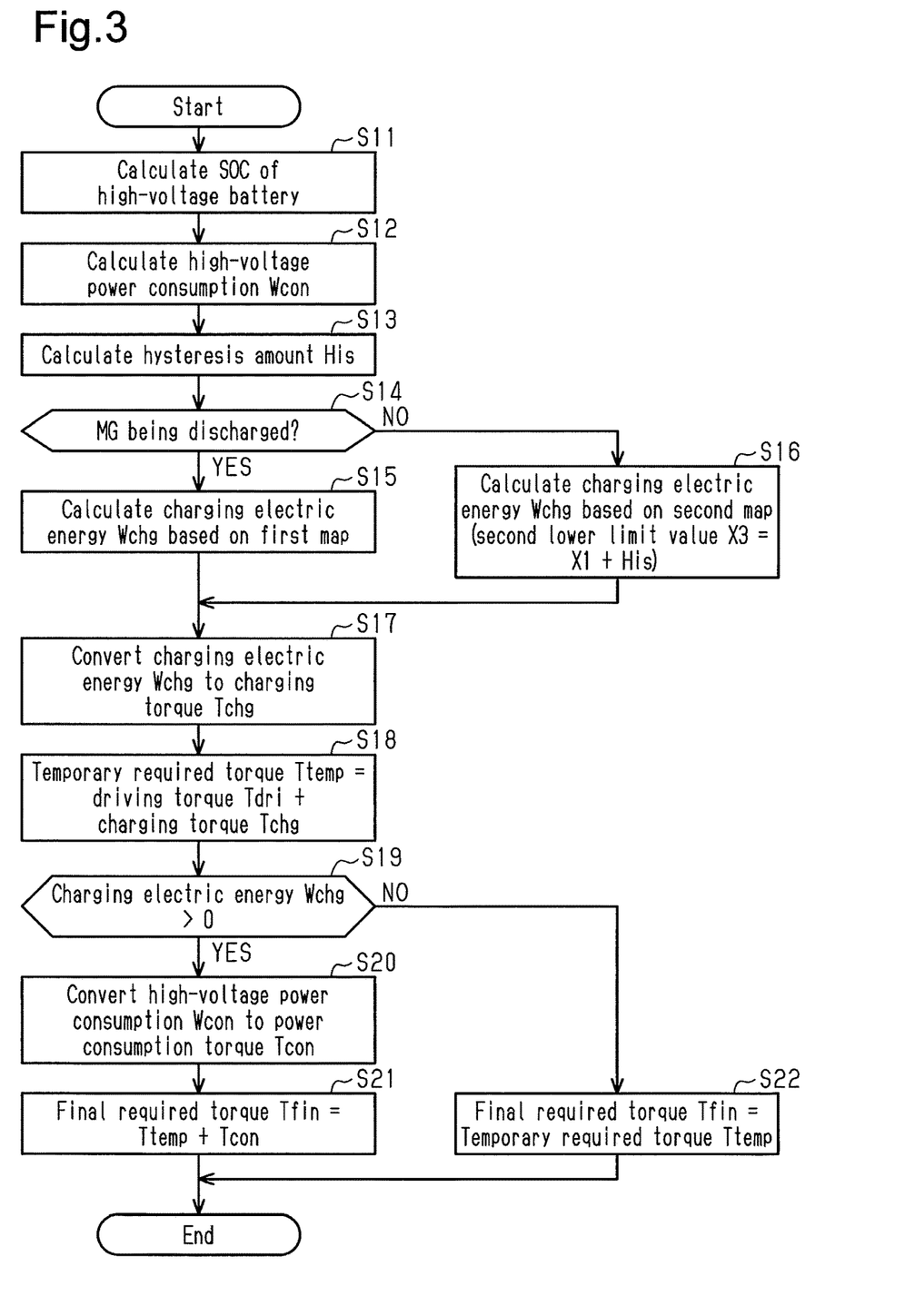
FIG. 3 is a flowchart showing a process of calculating a required torque of the engine in the hybrid system of FIG. 1.

Next, a process of calculating a required torque of the engine 10 performed by the electronic control unit 30 will be described. The required torque calculating process is repeatedly executed at a predetermined control cycle when the engine 10 is driven.

As shown in FIG. 3, when the required torque calculating process is executed, the electronic control unit 30 executes the process of step S11. In step S11, the electronic control unit 30 calculates the state of charge (SOC) of the high-voltage battery 22 based on the state information IH input from the high-voltage battery 22. After the state of charge of the high-voltage battery 22 is calculated, the electronic control unit 30 proceeds to step S12.

In step S12, the electronic control unit 30 calculates the high-voltage power consumption Wcon. More specifically, the electronic control unit 30 calculates the output power of the DC/DC converter 23 based on the operation signal MSc sent to the DC/DC converter 23. Furthermore, the electronic control unit 30 calculates the consumed power of the high-voltage auxiliary device 24 based on the operation signal MSac sent to the high-voltage auxiliary device 24. The electronic control unit 30 calculates, as the high-voltage power consumption Wcon, a value obtained by adding up the output power of the DC/DC converter 23 and the consumed power of the high-voltage auxiliary device 24. That is, the electronic control unit 30 functions as an electric power calculating section, which calculates the power consumption of each auxiliary device that receives electric power supply from the high-voltage battery 22. The electronic control unit 30 then proceeds to step S13.

In step S13, the electronic control unit 30 calculates the hysteresis amount His based on the high-voltage power consumption Wcon calculated in step S12. As shown in FIG. 4, the hysteresis amount His is calculated to be a greater value as the high-voltage power consumption Wcon is increased. After the hysteresis amount His is calculated, the electronic control unit 30 proceeds to step S14.

In step S14, the electronic control unit 30 determines whether the motor-generator 20 is being discharged during execution of step S14. That is, the electronic control unit 30 determines whether the motor-generator 20 is functioning as the electric motor providing torque assist to the engine 10. If it is determined that the motor-generator 20 is being discharged (YES in step S14), the electronic control unit 30 proceeds to step S15.

In step S15, the electronic control unit 30 calculates the charging electric energy Wchg based on the first map. As shown in FIG. 2, if the state of charge of the high-voltage battery 22 calculated in step S11 is less than the first lower limit value X1, the electronic control unit 30 calculates the charging electric energy Wchg to be a positive value, and if the state of charge of the high-voltage battery 22 calculated in step S11 is greater than or equal to the first lower limit value X1 and less than or equal to the upper limit value X2, the electronic control unit 30 calculates the charging electric energy Wchg to be zero. Furthermore, if the state of charge of the high-voltage battery 22 is greater than the upper limit value X2, the electronic control unit 30 calculates the charging electric energy Wchg to be a negative value.

In step S14, if it is determined that the motor-generator 20 is generating electric power (NO in step S14), the electronic control unit 30 proceeds to step S16. In step S16, the electronic control unit 30 calculates the charging electric energy Wchg based on the second map. As described above, in the second map, the second lower limit value X3 obtained by adding the hysteresis amount His calculated in step S12 to the first lower limit value X1 is applied instead of the first lower limit value X1. That is, as shown in FIG. 2, if the state of charge of the high-voltage battery 22 calculated in step S11 is less than the second lower limit value X3, the electronic control unit 30 calculates the charging electric energy Wchg to be a positive value, and if the state of charge of the high-voltage battery 22 calculated in step S11 is greater than or equal to the second lower limit value X3 and less than or equal to the upper limit value X2, the electronic control unit 30 calculates the charging electric energy Wchg to be zero. Furthermore, if the state of charge of the high-voltage battery 22 exceeds the upper limit value X2, the electronic control unit 30 calculates the charging electric energy Wchg to be a negative value.

According to the processes in step S15 and step S16, the electronic control unit 30 functions as the electric power calculating section, which calculates the charging electric energy Wchg transferred between the motor-generator 20 and the high-voltage battery 22. When the charging electric energy Wchg of the high-voltage battery 22 is a positive value, it indicates that electric power is supplied to the high-voltage battery 22, and when the charging electric energy Wchg is a negative value, it indicates that electric power is output from the high-voltage battery 22.

When the charging electric energy Wchg is calculated in step S15 or step S16, the electronic control unit 30 proceeds to step S17. In step S17, the electronic control unit 30 converts the charging electric energy Wchg calculated in step S15 or step S16 to a charging torque Tchg. More specifically, the electronic control unit 30 calculates, as the charging torque Tchg, the torque to be transmitted from the engine 10 to the motor-generator 20 so that the motor-generator 20 generates the charging electric energy Wchg. The conversion from the charging electric energy Wchg to the charging torque Tchg is performed by substituting numerical values in an expression such as a relational expression. The expression such as the relational expression used for this conversion is previously determined through tests, simulations, and like methods. After calculating the charging torque Tchg, the electronic control unit 30 proceeds to step S18.

In step S18, the electronic control unit 30 calculates a temporary required torque Ttemp based on a driving torque Tdri and the charging torque Tchg calculated in step S17. The driving torque Tdri is a torque required to propel the vehicle and is calculated based on, for example, the speed of the engine 10, the gas pedal depression amount Acc detected by the gas pedal sensor 35, and the vehicle speed SP detected by the vehicle speed sensor 37. The speed of the engine 10 is calculated based on the rotational angle CA detected by the crank angle sensor 36. The electronic control unit 30 calculates the temporary required torque Ttemp by adding the charging torque Tchg to the driving torque Tdri. Subsequently, the electronic control unit 30 proceeds to step S19.

In step S19, the electronic control unit 30 determines whether the charging electric energy Wchg calculated in step S15 or step S16 is greater than zero. If it is determined that the charging electric energy Wchg is greater than zero (YES in step S19), the electronic control unit 30 proceeds to step S20.

In step S20, the electronic control unit 30 converts the high-voltage power consumption Wcon calculated in step S12 to a power consumption torque Tcon. More specifically, the electronic control unit 30 calculates, as the power consumption torque Tcon, a torque to be transmitted from the engine 10 to the motor-generator 20 so that the motor-generator 20 generates electric power corresponding to the high-voltage power consumption Wcon. The conversion of the high-voltage power consumption Wcon to the power consumption torque Tcon is performed by substituting numerical values in an expression such as a relational expression. Furthermore, the expression such as the relational expression used for this conversion is previously determined through tests, simulations, and like methods. After the power consumption torque Tcon is calculated, the electronic control unit 30 proceeds to step S21.

In step S21, the electronic control unit 30 calculates a final required torque Tfin by adding the power consumption torque Tcon calculated in step S20 to the temporary required torque Ttemp calculated in step S18. The operation signal MSen corresponding to the final required torque Tfin is then output to the engine 10. Subsequently, the required torque calculating process performed by the electronic control unit 30 is temporarily suspended, and the process of step S11 is executed again after a predetermined number of control cycles.

In step S19, if it is determined that the charging electric energy Wchg is less than or equal to zero (NO in step S19), the electronic control unit 30 proceeds to step S22. In step S22, the electronic control unit 30 sets the final required torque Tfin to the temporary required torque Ttemp calculated in step S18 without any change. The operation signal MSen corresponding to the final required torque Tfin is then output to the engine 10. Subsequently, the required torque calculating process performed by the electronic control unit 30 is temporarily suspended, and the process of step S11 is executed again after a predetermined number of control cycles.

In this manner, the electronic control unit 30 functions as an engine control section, which calculates the required torque (final required torque Tfin) of the engine 10 based on the charging electric energy Wchg (charging torque Tchg), the driving torque Tdri, and if necessary the high-voltage power consumption Wcon (the power consumption torque Tcon).

The operation and advantages of the present embodiment will now be described.

Figure 6:
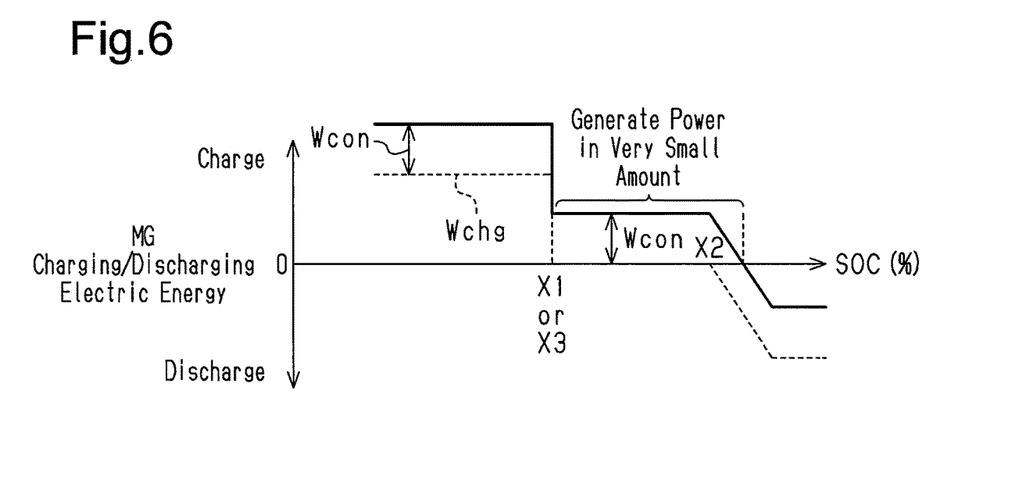
FIG. 6 is a graph showing the relationship between the state of charge of a typical battery relative to the charging electric energy and the discharging electric energy of the motor-generator.

In calculating the final required torque Tfin of the engine 10, the final required torque Tfin may be calculated by adding up the driving torque Tdri, the charging torque Tchg, and the power consumption torque Tcon regardless of the state of charge of the high-voltage battery 22. In this case, even if the charging electric energy Wchg of the high-voltage battery 22 is zero, electric power corresponding to the high-voltage power consumption Wcon of the DC/DC converter 23 and the high-voltage auxiliary device 24 can be generated by the motor-generator 20. More specifically, as shown in FIG. 6, when the state of charge of the high-voltage battery 22 is greater than or equal to the first lower limit value X1 (or the second lower limit value X3) and less than or equal to the upper limit value X2, in other words, when the charging electric energy Wchg is calculated to be zero, the power generation amount of the motor-generator 20 is substantially the same as the high-voltage power consumption Wcon.

In the present embodiment, since the 48-V battery is employed as the high-voltage battery 22, the amount of electric energy that can be output by the high-voltage battery 22 is limited as compared with a case in which, for example, a battery with two-hundred and some tens of volts is employed. Thus, the output power of the DC/DC converter 23 and the consumed power of the high-voltage auxiliary device 24 are also relatively small. Thus, depending on the condition of the vehicle, the high-voltage power consumption Wcon, which is a value obtained by adding up the output power of the DC/DC converter 23 and the consumed power of the high-voltage auxiliary device 24, may be small. If the motor-generator 20 is to generate a very small amount of the high-voltage power consumption Wcon, the power generation efficiency is decreased, and the fuel efficiency may deteriorate.

Figure 5:
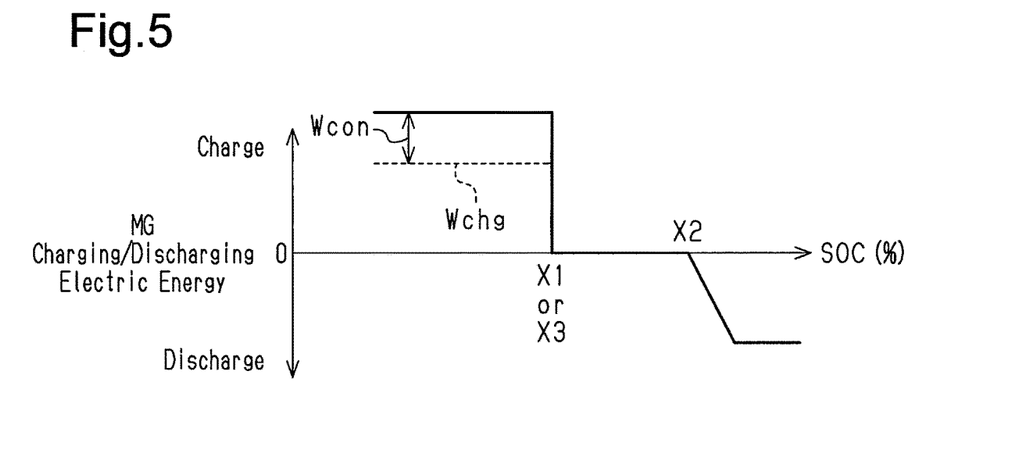
FIG. 5 is a graph showing the relationship between the state of charge of the high-voltage battery relative to a charging electric energy and a discharging electric energy of the motor-generator in the hybrid system of FIG. 1.

In the present embodiment, when the state of charge of the high-voltage battery 22 is less than the first lower limit value X1 (or the second lower limit value X3), and the charging electric energy Wchg is greater than zero, the final required torque Tfin is calculated by adding up the driving torque Tdri, the charging torque Tchg, and the power consumption torque Tcon. In this case, as shown in FIG. 5, the power generation amount of the motor-generator 20 is obtained by adding the high-voltage power consumption Wcon to the charging electric energy Wchg of the high-voltage battery 22. Thus, the output power of the DC/DC converter 23 and the consumed power of the high-voltage auxiliary device 24 are covered by the power generation of the motor-generator 20. Furthermore, since an adequate amount of power is generated as the power generation amount of the motor-generator 20, the power generation efficiency is prevented from being decreased due to excessively small power generation amount.

In the present embodiment, when the state of charge of the high-voltage battery 22 is greater than or equal to the first lower limit value X1 (or the second lower limit value X3) and less than or equal to the upper limit value X2, the final required torque Tfin is calculated by adding up the driving torque Tdri and the charging torque Tchg. That is, in this case, the power consumption torque Tcon (the high-voltage power consumption Wcon) is not taken into consideration in calculating the final required torque Tfin. When the state of charge of the high-voltage battery 22 is greater than or equal to the first lower limit value X1 (or the second lower limit value X3) and less than or equal to the upper limit value X2, the charging torque Tchg is zero, and thus the final required torque Tfin is equal to the driving torque Tdri. As a result, as shown in FIG. 5, when the state of charge of the high-voltage battery 22 is greater than or equal to the first lower limit value X1 (or the second lower limit value X3) and less than or equal to the upper limit value X2, the power generation amount of the motor-generator 20 is zero. Thus, electric power for the high-voltage power consumption Wcon is not generated in a very small amount, and the fuel efficiency is inhibited from deteriorating. Although the high-voltage power consumption Wcon is a variable value that is changed in accordance with the driving condition of the DC/DC converter 23 and the high-voltage auxiliary device 24, the high-voltage power consumption Wcon is illustrated as a constant value in FIGS. 5 and 6.

When the state of charge of the high-voltage battery 22 exceeds the upper limit value X2, and the charging electric energy Wchg takes a negative value (the discharging electric energy takes a positive value), but a value obtained by adding up the charging electric energy Wchg and the high-voltage power consumption Wcon is a positive value, the motor-generator 20 may be considered to be required to generate power in a very small amount to compensate for some of the high-voltage power consumption Wcon. In other words, when the high-voltage power consumption Wcon is greater than the discharging electric energy that is discharged from the high-voltage battery 22, the motor-generator 20 may be considered to be required to generate power in a very small amount to compensate for the difference between the discharging electric energy and the high-voltage power consumption Wcon. In this respect, the present embodiment is configured not to take the power consumption torque Tcon (the high-voltage power consumption Wcon) into consideration in calculating the final required torque Tfin even if the state of charge of the high-voltage battery 22 exceeds the upper limit value X2. Thus, the motor-generator 20 does not need to generate power in a very small amount for the high-voltage power consumption Wcon.

In this manner, the present embodiment switches the map for calculating the charging electric energy Wchg of the high-voltage battery 22 depending on whether the motor-generator 20 is being discharged or generating electric power. As a result, as shown in FIG. 2, the lower limit value in the region of the charging electric energy Wchg in which the charging electric energy Wchg is calculated as zero includes hysteresis. Since the maps are switched, when the motor-generator 20 is generating electric power, the charging electric energy Wchg is calculated as a positive value even if the state of charge of the high-voltage battery 22 exceeds the first lower limit value X1 until the state of charge of the high-voltage battery 22 reaches the second lower limit value X3. Thus, the time period during which the motor-generator 20 generates electric power is extended, and the amount of electric energy that can be generated is increased as shown by the hatched area in FIG. 2. Moreover, in the present embodiment, as the high-voltage power consumption Wcon of the DC/DC converter 23 and the high-voltage auxiliary device 24 is increased, the difference between the first lower limit value X1 and the second lower limit value X3 is increased. Thus, the greater the high-voltage power consumption Wcon, the longer becomes the time period during which the motor-generator 20 can generate electric power.

As described above, the present embodiment employs the 48-V battery, which has a relatively low voltage, as the high-voltage battery 22. Thus, the power generation output of the motor-generator 20, which is driven by the high-voltage battery 22, is also relatively small. To enable the motor-generator 20, which has a small power generation output, to generate a great amount of power, it is very favorable to extend the time period during which the motor-generator 20 can generate electric power as described above.

The present embodiment may be modified as follows. The present embodiment and the following modifications can be combined as long as the combined modifications remain technically consistent with each other.

The manner in which the engine 10 and the motor-generator 20 are drivingly coupled to each other is not limited to that in the above-described embodiment. For example, a component such as a speed reducing mechanism including gears or a clutch that switches connection and disconnection of a driving force transmission path may be located between the engine 10 and the motor-generator 20. That is, as long as the engine 10 and the motor-generator 20 can transfer torque with each other, the technique of the above-described embodiment can be applied regardless of how the engine 10 and the motor-generator 20 are drivingly coupled to each other.

The high-voltage battery 22 and the low-voltage battery 25 may have any output voltage. A battery having an output voltage lower than 48 V or a battery having an output voltage higher than 48 V may be employed as the high-voltage battery 22. Alternatively, the output voltage of the low-voltage battery 25 does not necessarily have to be lower than the output voltage of the high-voltage battery 22. The output voltages of the low-voltage battery 25 and the high-voltage battery 22 may be the same.

The high-voltage auxiliary device 24 can be omitted. In this case, only the DC/DC converter 23 corresponds to the auxiliary device that receives electric power supply from the high-voltage battery 22.

As long as the electric power of the high-voltage battery 22 is steadily supplied to the low-voltage auxiliary device 26 via the DC/DC converter 23, the low-voltage battery 25 can be omitted.

The kinds of the high-voltage battery 22 and the low-voltage battery 25 are not limited to the illustrated embodiment. For example, a nickel-hydrogen battery or a sodium-sulfur (NaS) battery may be employed as the high-voltage battery 22 and the low-voltage battery 25 besides a lithium-ion battery and a lead-acid battery.

In the above-described embodiment, the high-voltage power consumption Wcon is calculated based on the operation signal MSc and the operation signal MSac. However, if, for example, the output voltage/current and the input voltage/current of the DC/DC converter 23 and the high-voltage auxiliary device 24 can be detected, the high-voltage power consumption Wcon may be calculated using these values.

In the above-described embodiment, when the state of charge of the high-voltage battery 22 is less than the first lower limit value X1 (or the second lower limit value X3), the charging electric energy Wchg takes a positive constant value. However, the configuration is not limited to this. For example, as the state of charge becomes smaller than the first lower limit value X1 (or the second lower limit value X3), the charging electric energy Wchg may be increased. When the state of charge becomes smaller than a certain value, the charging electric energy Wchg may become constant.

In the above-described embodiment, when the state of charge of the high-voltage battery 22 is greater than the upper limit value X2, the charging electric energy Wchg may take a negative constant value, that is, the discharging electric energy may be constant.

In the above-described embodiment, the second lower limit value X3 is calculated by adding the hysteresis amount His to the first lower limit value X1 of the first map, which is used when the motor-generator 20 is being discharged. However, the configuration is not limited to this. the first lower limit value X1 may be calculated by subtracting the hysteresis amount His from the second lower limit value X3 of the second map, which is used when the motor-generator 20 is generating electric power.

The relationship between the hysteresis amount His and the high-voltage power consumption Wcon is not limited to the example in the illustrated embodiment. For example, as the high-voltage power consumption Wcon is increased, the hysteresis amount His may be increased in a stepwise manner. In this case also, the hysteresis amount His is greater, that is, the difference between the first lower limit value X1 and the second lower limit value X3 is greater when the high-voltage power consumption Wcon is great than when the high-voltage power consumption Wcon is small.

In the first map and the second map, the hysteresis amount His of the second lower limit value X3 with respect to the first lower limit value X1 does not necessarily have to be calculated based on the high-voltage power consumption Wcon. For example, the hysteresis amount His may be calculated to be a greater value as the state of charge of the high-voltage battery 22 is decreased.

Alternatively, the hysteresis amount His of the second lower limit value X3 with respect to the first lower limit value X1 may be a fixed value instead of a value that changes in accordance with the high-voltage power consumption Wcon or other values.

Furthermore, the charging electric energy Wchg may be calculated using the same map regardless of whether the motor-generator 20 is being discharged. That is, the hysteresis amount His may be zero.

The changing amount of the charging electric energy Wchg calculated at every control cycle may have a restriction value. More specifically, assume that the motor-generator 20 is changed from a discharging state to an electric power generating state under a condition in which the state of charge of the high-voltage battery 22 is greater than the first lower limit value X1 and less than the second lower limit value X3. In this case, since the map for calculating the charging electric energy Wchg is shifted from the first map to the second map, the charging electric energy Wchg is rapidly changed from zero to a positive constant value. Even if the map is not shifted, for example, when the state of charge of the high-voltage battery 22 is changed from a value greater than or equal to the first lower limit value X1 to a value less than the first lower limit value X1, the charging electric energy Wchg is rapidly changed from zero to a positive constant value. When the charging electric energy Wchg is rapidly changed in this manner, the motor-generator 20 may receive excessive load. If the changing amount of the charging electric energy Wchg has the restriction value as described above, the charging electric energy Wchg changes slowly to some extent even under the above-described conditions also, so that the motor-generator 20 does not receive excessive load.

When the state of charge of the high-voltage battery 22 is greater than the upper limit value X2, and the value obtained by adding up the charging electric energy Wchg and the high-voltage power consumption Wcon is less than or equal to zero, the final required torque Tfin may be calculated by adding the driving torque Tdri, the charging torque Tchg, and the power consumption torque Tcon. That is, when the high-voltage power consumption Wcon is less than or equal to the discharging electric energy discharged from the high-voltage battery 22 to the motor-generator 20, the final required torque Tfin may be calculated taking the high-voltage power consumption Wcon into consideration. Since the high-voltage power consumption Wcon is covered by the electric power discharged from the high-voltage battery 22 under the above-described conditions, even if the final required torque Tfin is calculated taking the high-voltage power consumption Wcon into consideration, the motor-generator 20 does not need to generate electric power in a very small amount. Calculating the final required torque Tfin taking the high-voltage power consumption Wcon into consideration as described above reduces electric power output from the high-voltage battery 22 in order to provide torque assist to the engine 10. Thus, the state of charge of the high-voltage battery 22 is prevented from being excessively decreased.

When the state of charge of the high-voltage battery 22 is greater than the upper limit value X2, and a value obtained by adding up the charging electric energy Wchg and the high-voltage power consumption Wcon is greater than zero, the high-voltage power consumption Wcon and the charging electric energy Wchg may both be excluded from consideration, and the final required torque Tfin may be set to the driving torque Tdri. In this case, since the high-voltage power consumption Wcon that is greater than the charging electric energy Wchg is consumed by the high-voltage auxiliary device 24, the discharge request of the high-voltage battery 22 is satisfied by the driving of the high-voltage auxiliary device 24. In this case, the motor-generator 20 is stopped. That is, neither electric power is supplied from the high-voltage battery 22 to the motor-generator 20, nor electric power is charged from the motor-generator 20 to the high-voltage battery 22.

When the state of charge of the high-voltage battery 22 is greater than or equal to the first lower limit value X1 (or the second lower limit value X3), and a value obtained by adding up the charging electric energy Wchg and the high-voltage power consumption Wcon is greater than a predetermined positive threshold value, the final required torque Tfin may be calculated by taking the high-voltage power consumption Wcon into consideration, that is, the final required torque Tfin may be calculated based on the high-voltage power consumption Wcon, the charging electric energy Wchg, and the driving torque Tdri. If the amount of electric energy that is likely to improve the power generation efficiency of the motor-generator 20 to some extent is set as the above-described positive threshold value, even if the final required torque Tfin is calculated taking the high-voltage power consumption Wcon into consideration, deterioration of fuel efficiency is inhibited that is otherwise caused when the motor-generator 20 generates electric power in a very small amount.

If this modification is employed, for example, in the routine of the required torque calculating process shown in FIG. 3, it is determined whether a value obtained by adding up the charging electric energy Wchg and the high-voltage power consumption Wcon is less than the above-described positive threshold value after step S15 or step S16 and before step S17. If it is determined that the value is less than the positive threshold value, the processes subsequent to step S17 are executed. If it is determined that the value is greater than or equal to the positive threshold value, the final required torque Tfin is calculated based on the driving torque Tdri, the charging torque Tchg, and the power consumption torque Tcon.

If the state of charge of the high-voltage battery 22 is greater than the upper limit value X2, the final required torque Tfin may be calculated by adding up the driving torque Tdri, the charging torque Tchg, and the power consumption torque Tcon regardless of the relationship between the level of the charging electric energy Wchg and the level of the high-voltage power consumption Wcon. In this case, the motor-generator 20 may generate electric power in a very small amount depending on the level of the high-voltage power consumption Wcon. However, if the state of charge of the high-voltage battery 22 changes to some extent, the state in which electric power is generated in a very small amount is eliminated. This minimizes deterioration of fuel efficiency that is otherwise caused when the motor-generator 20 generates electric power in a very small amount.

The electronic control unit can be constructed by a device that includes a CPU and a ROM and executes software processing, but is not limited to this configuration. For example, at least part of the processes executed by the software in the above-described embodiment may be executed by hardware circuits dedicated to execution of these processes (such as ASIC). That is, the controller may be modified as long as it has any one of the following configurations (a) to (c). (a) A configuration including a processor that executes all of the above-described processes according to programs and a program storage device such as a ROM (including a non-transitory computer readable medium) that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

The invention claimed is:

1. A hybrid system of a vehicle that includes an engine, a motor-generator drivingly coupled to the engine, a battery which supplies electric power to the motor-generator, and an auxiliary device which receives electric power supply from the battery, the hybrid system further including processing circuitry that is configured to perform operations comprising:

calculating a charging electric energy transferred between the motor-generator and the battery based on a state of charge of the battery and calculating a power consumption of the auxiliary device; and calculating a required torque of the engine based on at least one of the charging electric energy, the power consumption, and a driving torque, which is required to propel the vehicle, wherein the processing circuitry is further configured to:
calculate the charging electric energy by:
calculating the charging electric energy such that electric power is supplied from the motor-generator to charge the battery when the state of charge of the battery is less than a predetermined lower limit value, calculating the charging electric energy such that the battery is neither charged nor discharged by the motor-generator when the state of charge is greater than or equal to the predetermined lower limit value and less than or equal to an upper limit value, the upper limit value being previously set to a value greater than the predetermined lower limit value, and calculating the charging electric energy such that electric power is supplied from the battery to the motor-generator when the state of charge is greater than the upper limit value, calculate the required torque by:
calculating the required torque based on the charging electric energy, the power consumption, and the driving torque when the state of charge is less than the predetermined lower limit value and the charging electric energy corresponding to an amount of power supplied from the motor-generator to the battery is larger than zero, and calculating the required torque based on the charging electric energy and the driving torque without taking the power consumption into consideration, a battery discharge power covering the power consumption of the auxiliary device, when the state of charge is greater than or equal to the predetermined lower limit value and less than or equal to the upper limit value and the charging electric energy corresponding to the amount of power supplied from the motor-generator to the battery is zero, wherein discharging electric energy is the charging electric energy supplied from the battery to the motor-generator, and the processing circuitry is configured to calculate the required torque without taking into consideration both of the power consumption of the auxiliary device and the charging electric energy when the state of charge is greater than the upper limit value and the power consumption is greater than the discharging electric energy, and the motor-generator does not generate electric power to compensate for a shortage for the power consumption of the auxiliary device, and when the charging electric energy takes a value at which the battery is neither charged nor discharged by the motor-generator, the processing circuitry controls the hybrid system not to generate electric power by the motor-generator solely to generate electric power corresponding to the power consumption of the auxiliary device.

2. The hybrid system according to claim 1, wherein the processing circuitry is configured to calculate the required torque based on the charging electric energy, the power consumption, and the driving torque when the state of charge is greater than the upper limit value and the power consumption is less than or equal to the discharging electric energy.

3. The hybrid system according to claim 1, wherein the processing circuitry is configured to:
use a first lower limit value as the predetermined lower limit value when the motor generator is providing torque assist to the engine, and
use a second lower limit value greater than the first lower limit value as the predetermined lower limit value when the motor-generator is not providing torque assist to the engine.

4. The hybrid system according to claim 3, wherein the second lower limit value is set such that a difference between the first lower limit value and the second lower limit value is greater when the power consumption is large, relative to when the power consumption is small.

5. A non-transitory computer readable memory medium, which stores a program that causes a processing circuitry to perform a control process for a hybrid system of a vehicle, the hybrid system including an engine, a motor-generator drivingly coupled to the engine, a battery which supplies electric power to the motor-generator, and an auxiliary device which receives electric power supply from the battery, the control process including:
calculating, by the processing circuitry, a charging electric energy transferred between the motor-generator and the battery based on a state of charge of the battery,
calculating, by the processing circuitry, a power consumption of the auxiliary device, and
calculating, by the processing circuitry, a required torque of the engine based on the charging electric energy, the power consumption, and a driving torque, which is required to propel the vehicle, wherein:
the calculating the charging electric energy further includes:
calculating the charging electric energy such that electric power is supplied from the motor-generator to charge the battery when the state of charge of the battery is less than a predetermined lower limit value,
calculating the charging electric energy such that the battery is neither charged nor discharged by the motor-generator when the state of charge is greater than or equal to the predetermined lower limit value and less than or equal to an upper limit value, the upper limit value being previously set to a value greater than the predetermined lower limit value, and
calculating the charging electric energy such that electric power is supplied from the battery to the motor-generator when the state of charge is greater than the upper limit value, and
the calculating the required torque further includes:
calculating the required torque based on at least one of the charging electric energy, the power consumption, and the driving torque when the state of charge is less than the predetermined lower limit value and the charging electric energy corresponding to an amount of power supplied from the motor-generator to the battery is larger than zero, and
calculating the required torque based on the charging electric energy and the driving torque without taking the power consumption into consideration, a battery discharge power covering the power consumption of the auxiliary device, when the state of charge is greater than or equal to the predetermined lower limit value and less than or equal to the upper limit value and the charging electric energy corresponding to the amount of power supplied from the motor-generator to the battery is zero, discharging electric energy is the charging electric energy supplied from the battery to the motor-generator, and
calculating the required torque without taking into consideration both of the power consumption of the auxiliary device and the charging electric energy when the state of charge is greater than the upper limit value and the power consumption is greater than the discharging electric energy, and the motor-generator does not generate electric power to compensate for a shortage for the power consumption of the auxiliary device, and
when the charging electric energy takes a value at which the battery is neither charged nor discharged by the motor-generator, not generating electric power by the motor-generator solely to generate electric power corresponding to the power consumption of the auxiliary device.

\* \* \* \* \*